Figure 1:
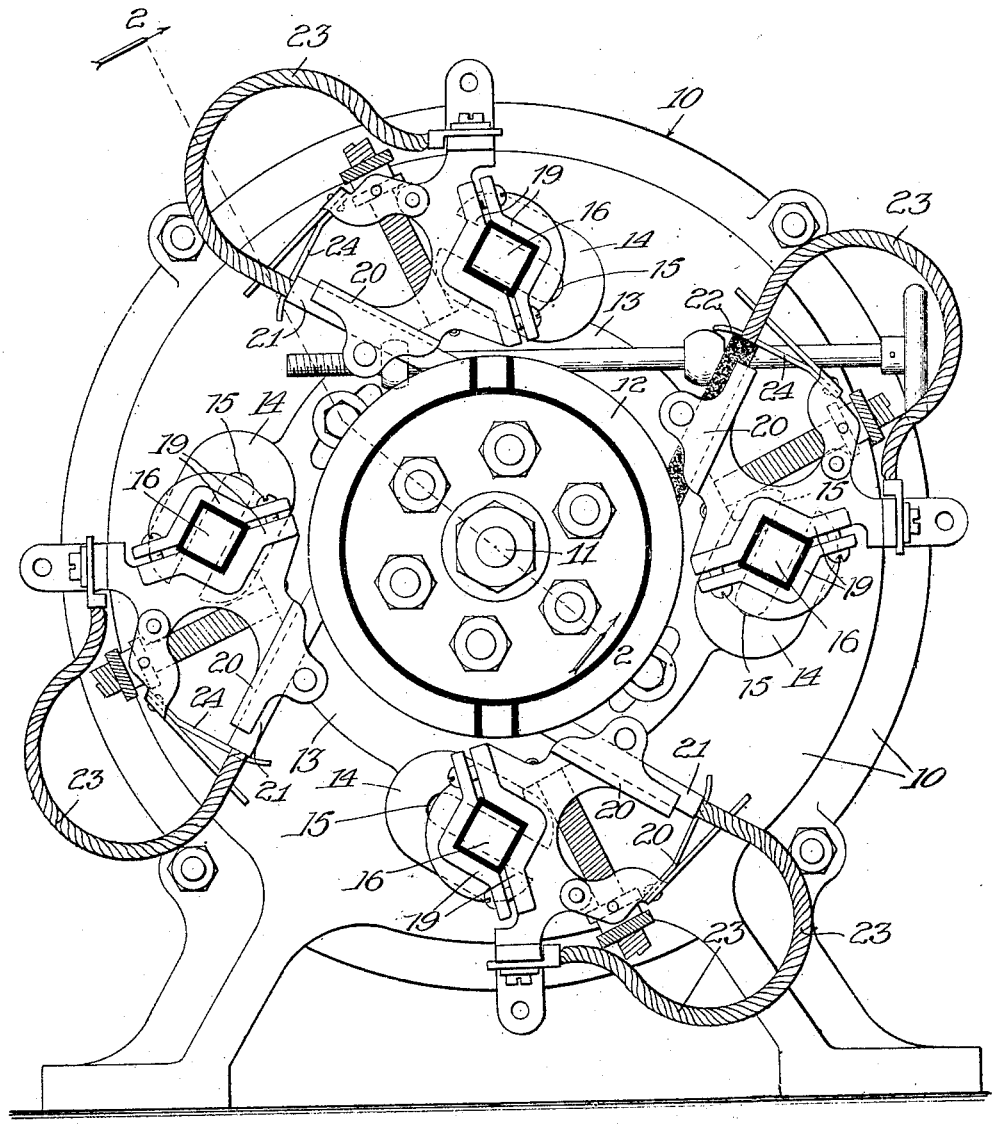

H. K. SANDELL.
BRUSH HOLDER.
APPLICATION FILED NOV. 6, 1919.

1,376,041.

Patented Apr. 26, 1921.
2 SHEETS—SHEET 1.

Inventor:
Henry K. Sandell,
By Dyrenforth, Lee, Chritton and Wiles,
Attys.

H. K. SANDELL.
BRUSH HOLDER.
APPLICATION FILED NOV. 6, 1919.
1,376,041.
Patented Apr. 26, 1921.
2 SHEETS—SHEET 2.
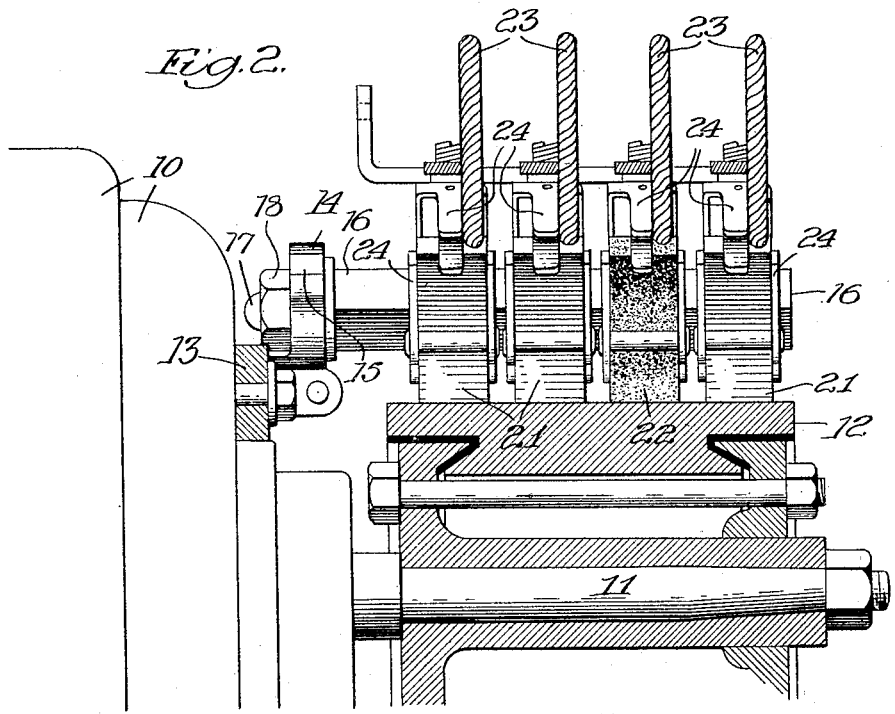
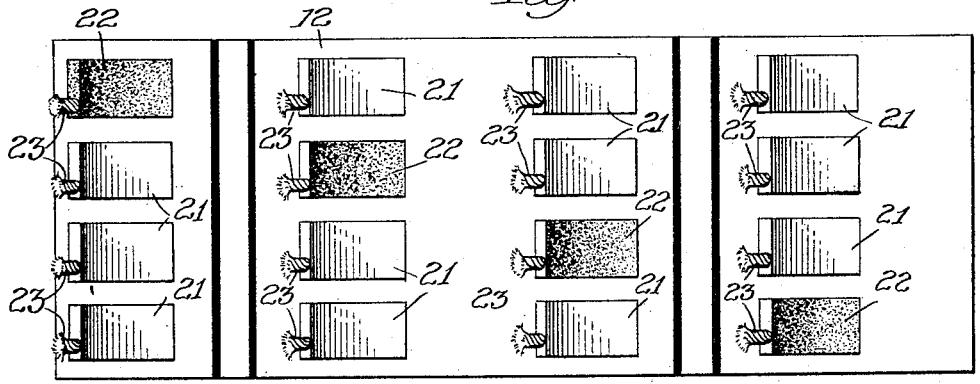
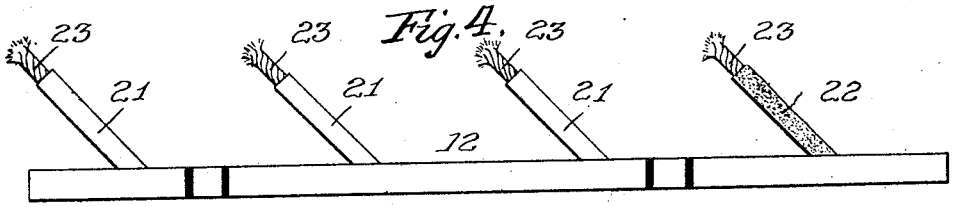
Inventor:
Henry K. Sandell,

UNITED STATES PATENT OFFICE.

HENRY K. SANDELL, OF CHICAGO, ILLINOIS, ASSIGNOR TO HERBERT S. MILLS, OF CHICAGO, ILLINOIS.

BRUSH-HOLDER.

1,376,041.   Specification of Letters Patent.   Patented Apr. 26, 1921.

Original application filed June 12, 1916, Serial No. 103,121. Divided and this application filed November 6, 1919. Serial No. 336,109.

*To all whom it may concern:*

Be it known that I, HENRY K. SANDELL, a citizen of the United States, residing at Chicago, in the county of Cook and State of Illinois, have invented a new and useful Improvement in Brush-Holders, of which the following is a specification.

My invention relates to improvements in rectifying commutators, and more particularly to the construction and arrangement of the contact brushes which bear thereon, and of the means for supporting the same. The invention will be more fully understood from the following detailed description, taken in connection with the accompanying drawings, in which—

Figure 1 is an elevation of the end of a dynamo electric machine, showing the manner of mounting the brush-holders. Fig. 2 is a section substantially on the line 2, of Fig. 1. Fig. 3 is a plan view showing a development of the commutator surface and the arrangement of the four sets of brushes thereon, and Fig. 4 is a side elevation of the developed construction shown in Fig. 3.

Referring more particularly to the drawings, the numeral 10 designates the frame of the machine and the numeral 11 the armature or rotor-shaft thereof. Fastened upon this shaft there is a commutator 12, which, in general, will consist of a plurality of insulated conductor segments, forming a truly cylindrical drum, as is well understood. The particular commutator illustrated in the drawings is that type of rectifying commutator which, being driven by a synchronous motor, is used for rectifying alternating currents, as described in my Patent No. 1242601 of October 9, 1917. Owing to the relatively heavy currents which must be rectified by a relatively small commutator in such service, and owing also to the difficulties inherent in any system of rectification working upon this principle, the commutation problem becomes a peculiarly difficult one, and it is with the object of improving both the mechanical and electrical action of such a device that my present invention is particularly concerned.

The end of the commutator-frame 10 adjacent the commutator 12 has secured thereto a ring 13, which carries a plurality of outstanding lugs 14, each of which is slotted at a definite angle (as will later appear), the slots being indicated in dotted lines in Fig. 1 at 15. A bar 16 has a reduced extremity 17 passing through the slot 15 of each of the lugs 14, the reduced extremity being secured by a nut 18. The bars 16 each carry four brush-holders 19 which are clamped thereupon, as shown in Fig. 1, each brush-holder having a brush-guide portion 20 adapted to receive the contact brush and to maintain the same at a fixed angle to the surface of the commutator. The angle of the brush-guide 20 will be determined in practice according to the conditions of service of the device, and the slot 15 in the lug 14 will be milled in exact parallelism with the guide.

Two kinds of brushes are preferably employed in the machine. The current-carrying brushes, which are designated 21, are preferably constructed of a cast alloy having the following composition (parts by weight): copper 8, antimony 4, nickel 1, lead 1. Each arm 16 carries three of these conducting brushes 21, and a fourth brush 22, preferably formed of carbon or graphite, and as is shown in the developed view of the commutator and brushes shown in Fig. 3, the brushes 22 are arranged one in each of the four rows, so that every portion of the commutator which bears upon the conductor brushes 21 will also bear upon the brushes 22.

All of the before-mentioned brushes are provided with the usual "pigtails" 23, and each brush is normally held in engagement with the commutator by a spring-pressed arm 24 on the brush-holder.

My construction is distinguished by the following peculiarities of operation: Owing to the fact that the slots 15 in which the brush-carrying arms 16 are supported, are milled at precisely the angle of the brush-guides 20, the arm may be adjusted within the slot, as by loosening the securing nut 18, to cause the brush-guide 20 to approach or recede from the face of the commutator, without affecting either the angle of contact of the brush with the commutator or the point of contact.

The individual arms may, therefore, be adjusted as may be required without affecting the exact angular relation of the brushes, either with relation to one another, or with relation to the commutator.

The conductor brushes 21, being formed of cast metal of approximately the composition specified, are of very low resistance and capable of carrying heavy currents without destructive heating. It is of advantage, however, in order to minimize wear upon the commutator and of the brushes themselves, to provide continuously a lubricant of some form. The carbon or graphite brushes 22 accomplish this purpose perfectly, one of these brushes being in alinement with each peripheral row of the conductor brushes proper. There is a further distinct advantage in the arrangement shown, in that since the brushes 21 are necessarily of considerable weight, they may be kicked off of the surface of the commutator by slight irregularities thereon, and by reason of their mass or weight they will remain out of contact with the commutator for a relatively long period before the spring employed can overcome the inertia of the brush mass. The carbon brushes 22 prevent sparking under such conditions by reason of the fact that these brushes, being relatively light, will be kept in contact with the commutator more readily, and will, therefore, form shunt-circuits about the conductor brushes to prevent arcing of the latter. It is, of course, true that the carbon brushes will be wholly incapable of carrying the maximum or normal load of the conductor brushes for any substantial proportion of the time, but they are nevertheless ample to prevent sparking during the relatively short intervals in which the conductor brushes remain out of contact.

While I have shown and described, in considerable detail, one specific embodiment of my invention, it is to be regarded as illustrative only, and not as a limitation of the scope of the same, except in so far as such limitation is included within the terms of the following claims, in which it is my intention to claim all novelty inherent in my invention as broadly as is permissible, in view of the prior art.

What I claim as new and desire to secure by Letters Patent is,—

1. In a dynamo electric machine, a frame, a commutator, a brush-guide arranged in a line intersecting the surface of the commutator, a brush longitudinally movable in the guide, an arm extending parallel to the cylindrical surface of the commutator and supporting the said brush-guide, and a slotted member carried by the frame, having its slot parallel to the brush-guide, and means for securing the arm in adjusted positions along the length of the said slot, whereby by adjustment of the arm the brush-guide is moved in the direction of its length only.

2. In a dynamo electric machine, a frame, a commutator, a ring secured to the frame, equally spaced slotted lugs supported on the ring, arms adjustably secured in the slots in said lugs and extending parallel to the axis of the commutator, brush guides secured to said arms, said brush-guides being disposed in a line intersecting the surface of the commutator, and brushes longitudinally movable in said guides to contact with the commutator surface, the guides and the slots of the corresponding slotted lugs being parallel.

HENRY K. SANDELL.